G. FRANKS AND O. SPROESSIG.
STEAMER, CLEANER, AND PRESSER.
APPLICATION FILED DEC. 13, 1919.
1,373,879.
Patented Apr. 5, 1921.
2 SHEETS—SHEET 1.
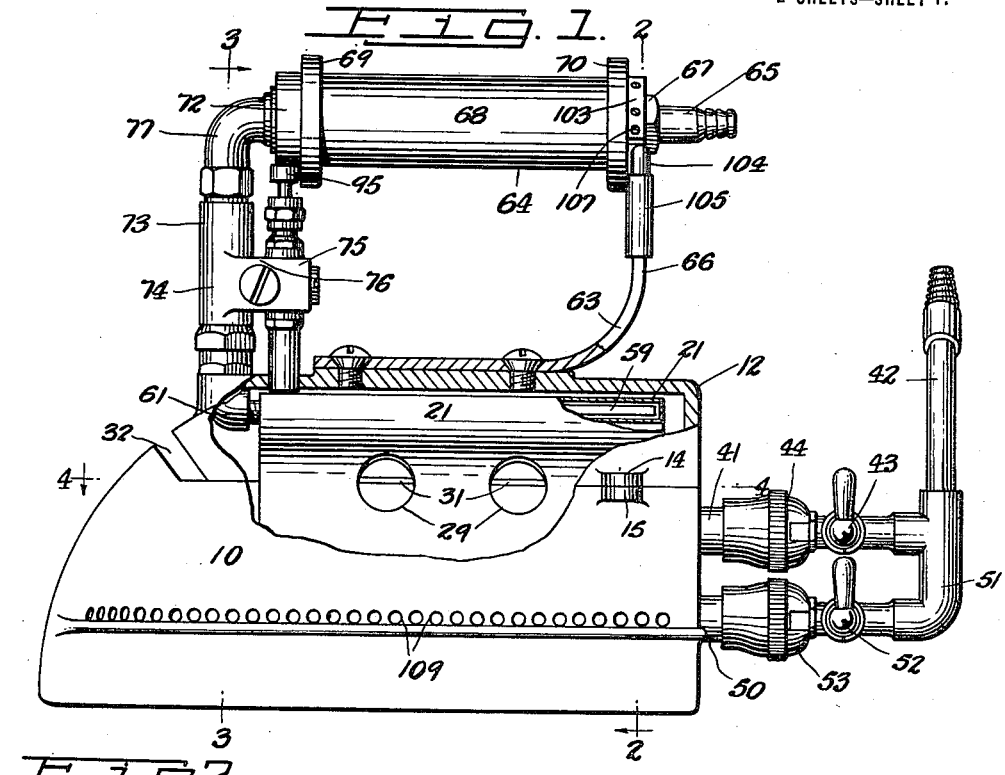
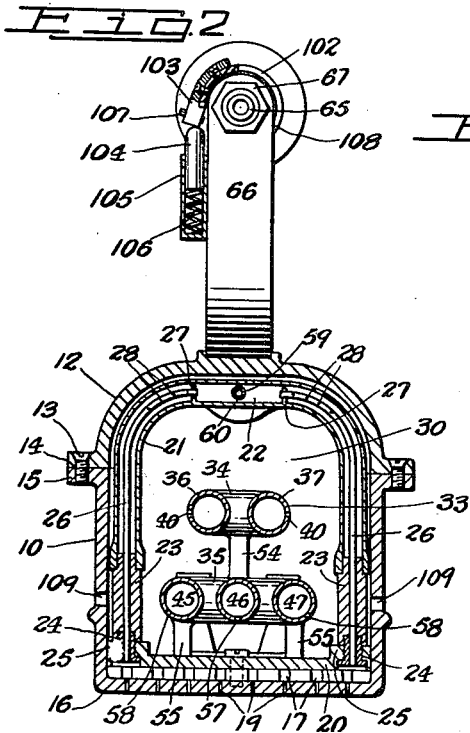
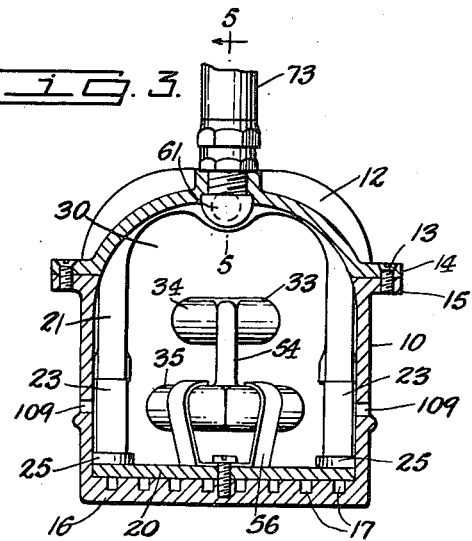
Inventors
George Franks
Oscar Sproessig
By their Attorneys
Edgar Tate & Co.

G. FRANKS AND O. SPROESSIG.
STEAMER, CLEANER, AND PRESSER.
APPLICATION FILED DEC. 13, 1919.
1,373,879.
Patented Apr. 5, 1921.
2 SHEETS—SHEET 2.
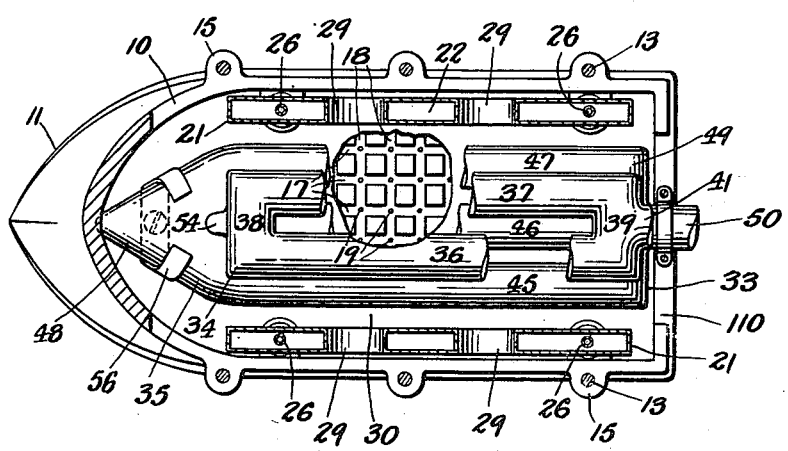
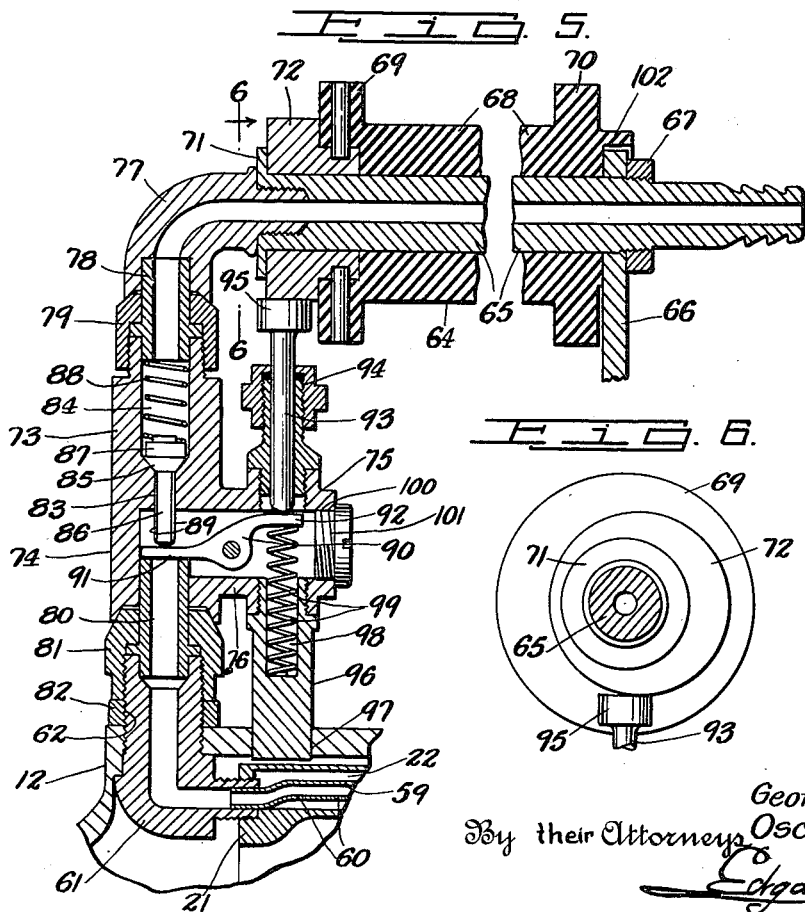
Inventors
George Franks
Oscar Sproessig
By their Attorneys
Edgar Vale

UNITED STATES PATENT OFFICE.

GEORGE FRANKS AND OSCAR SPROESSIG, OF NEW YORK, N. Y.

STEAMER, CLEANER, AND PRESSER.

1,373,879.  Specification of Letters Patent.  Patented Apr. 5, 1921.

Application filed December 13, 1919. Serial No. 344,521.

*To all whom it may concern:*

Be it known that we, GEORGE FRANKS and OSCAR SPROESSIG, citizens of the United States, and residing at New York, in the county of New York and State of New York, have invented certain new and useful Improvements in Steamers, Cleaners, and Pressers, of which the following is a specification, such as will enable those skilled in the art to which it appertains to make and use the same.

This invention relates to devices for use by tailors and others in steaming, cleaning and pressing garments; and the object of the invention is to provide an improved device of this class with means whereby said device may be used as a presser; a further object being to provide means whereby the device may be used as a steamer, cleaner and presser; and with these and other objects in view the invention consists in a device of the class and for the purpose specified which is simple in construction, efficient in operation and convenient of manipulation.

The invention described and claimed herein is an improvement on that described and claimed in a prior patent granted to us March 13, 1917, No. 1,218,639, and is fully disclosed in the following specification, of which the accompanying drawings form a part, in which the separate parts of our improvement are designated by suitable reference characters in each of the views, and in which:—

Figure 1 is a side view of our improved device with part of the construction broken away and in section;

Fig. 2 a partial section on the line 2—2 of Fig. 1;

Fig. 3 a partial section on the line 3—3 of Fig. 1;

Fig. 4 a partial section on the line 4—4 of Fig. 1;

Fig. 5 a partial section on the line 5—5 of Fig. 3 and on an enlarged scale; and, Fig. 6 a partial section on the line 6—6 of Fig. 5.

In the accompanying drawing 10 represents the main body or casing of the device which is of the general form of an ordinary sadiron, and which is oblong and approximately rectangular in form in cross section, and the front end portion of which is tapered as shown at 11 in Fig. 4. The casing 10 is provided with a detachable cover plate 12 which is secured thereto by screws 13 passed through ears 14 and 15 in the cover plate and casing respectively.

The bottom 16 of the casing 10, or the inner face thereof, is provided with a plurality of longitudinal grooves 17 and a plurality of transverse grooves 18, and the bottom 16 of the casing is provided where the separate grooves 17 and 18 intersect with apertures 19, which pass out through the bottom face thereof, as clearly shown in Fig. 2. Secured within the casing 10 is a supplemental bottom 20 which serves to close and seal the grooves 17 and 18 to form ports or passages thereof through which steam may pass, as hereinafter described, and out through the apertures 19.

Mounted in the casing 10 is a steam generator or boiler 21 which extends approximately the full length of the casing, or of the rectangular portion thereof as shown in Figs. 1 and 4, and said generator is approximately U-shaped in form in cross section. The generator is composed of a hollow casing having a steam chamber 22, and said generator is mounted in connection with the supplemental bottom 20 by four coupling members 23 secured in position by sleeves 24 countersunk in enlarged portions 25 on the supplemental bottom 20. The couplings 23 are preferably secured to the generator 21 by welding, brazing or the like. Passed through each of the couplings 23 and sleeves 24 are steam pipes 26, the upper ends of which are mounted in longitudinal baffle plates 27 in the top portion of the steam chamber 22 of said generator. The upper end portions of the pipes 26 are each provided with a plurality of spaced apertures 28 indicated in Fig. 2 through which steam produced by the generator passes into and through the pipes 26 downwardly into the ports or passages formed by the grooves 17 and 18 in the bottom 16 of the casing 10. The generator 21, or the sides thereof, are each provided with apertures 29 through which products of combustion from the combustion chamber 30 within the casing 10 and generator 21 may pass out through passages 31 between the casing 10 and cover plate 12 and through an aperture 32 at the front of the device as shown in Fig. 1.

Mounted within the combustion chamber 30 is a burner device 33 having top and bottom burners 34 and 35. The top burner 34 consists of two burner tubes 36 and 37 joined at its ends as shown at 38 and 39 in Fig. 4. The tubes 36 and 37 are each provided with a plurality of outwardly directed discharge tubes 40 as shown in Fig. 2 and a gas supply pipe 41 connects with the end 39 of the tubes 36 and 37, said pipe communicating with the main gas supply pipe 42 through a suitable valve 43 and air regulator 44 as shown in Fig. 1.

The bottom burner 35 consists of three burner tubes 45, 46 and 47, and these tubes are joined at their inner end in the form of a V-shaped projection 48 and the outer ends of said tubes are joined by a cross head 49 with which a gas supply pipe 50 communicates. The gas supply pipe 50 also communicates with the main gas supply pipe 42, as shown at 51, and the supply of gas to the pipe 50 is controlled by a valve 52 inwardly of which is an air regulator 53. The top and bottom burners 34 and 35 are joined at the front by a web member 54 and the bottom burner 35 is provided with a plurality of feet 55 which rest upon the supplemental bottom 20 of the casing 10, and the inner or projecting end 48 of the burner 35 fits in a guide and supporting member 56 secured to the supplemental bottom 20, as clearly shown in Figs. 3 and 4.

The burner tube 46 is provided with a plurality of downwardly directed discharges 57, while the tubes 45 and 47 are provided with a plurality of downwardly and outwardly directed discharges 58 as shown in Fig. 2.

The burner 34 consists of the tubes 36 and 37 which operate in connection with the steam generator or boiler 21 to hold the water supplied thereto, as hereinafter described, to generate steam which passes downwardly through the pipes 26 and out through the apertures 19 in the bottom 16 of the casing 10. The burner 35 which consists of the tubes 45, 46 and 47 operates in connection with the bottom 16 of the casing and the supplemental bottom thereof to heat the same in using the device as a presser. Mounted centrally and longitudinally of the top portion of the generator 21 within the chamber 22 thereof is a water supply pipe 59 having a plurality of downwardly directed discharges 60 spaced longitudinally of said pipe. The inner end of the pipe 59 is connected with an elbow-shaped coupling 61 secured to the generator 21, as clearly shown in Fig. 5, and said coupling passes upwardly through the top of the cover plate 12 and is externally threaded as shown at 62.

Secured to the top of the cover plate is an approximately L-shaped bracket 63, which aids in supporting the handle member 64 for the device. The handle member 64 consists of a central longitudinal tube 65, the free end of which passes through the upwardly directed arm 66 of the bracket 63 and is secured in connection with said arm by a nut 67, and mounted on the tube 65 inwardly of the arm 66 is a hand-piece 68 preferably composed of non-heat conducting material, and the opposite end portions of which are provided with flanges 69 and 70.

The inner end of the tube 65 is flanged as shown at 71 and a cam device 72 is secured to the hand-piece 68 and movable therewith and is located between the flange 69 of said hand-piece and the flange 71 of the tube 65.

The tube 65 forms a water supply tube which is placed in communication with the tube 59 in the generator 21 through a suitable valve mechanism 73 shown in detail in Fig. 5, said valve mechanism comprising a main body portion 74 at one side of which is a supplemental body portion 75 connected with the main body portion as shown at 76. The main body portion 74 of the valve device is placed in communication with the tube 65 through an elbow 77 connected with the inner end of the tube 65 and a coupling sleeve 78 and a coupling nut 79. The lower end portion of the main body part of the valve device is placed in communication with the elbow-shaped coupling 61 through a sleeve coupling 80 and coupling nut 81. A lock nut 82 is also employed and mounted on the threaded extension 62 of the coupling 61 to securely hold said coupling in connection with the cover plate 12.

The valve device is provided with a port or passage 83, the upper end portion of which is enlarged as shown at 84 and joined therewith through a beveled valve seat 85 and a valve 86 is mounted in the port or passage 83 and is provided with a beveled head 87, which operates in connection with the seat 85 to normally close said port or passage. A spring 88 is mounted in the enlarged portion 84 of the port or passage 83 and normally serves to hold the valve 86 in its closed position. The stem of the valve 86 is grooved or otherwise cut out as indicated at 89 in Fig. 5 to permit the passage of water around said stem when the valve is raised.

Pivotally mounted in the valve device 73 where the main and supplemental bodies 74 and 75 are joined at 76 is a lever 90, one end portion 91 of which operates in connection with the lower end of the stem of the valve 86 and the other end 92 thereof operates in connection with a plunger 93 movable vertically through a stuffing box 94 secured to the supplemental body 75. The top of the plunger 93 is provided with an enlarged head 95 which operates in connection with the cam device 72. The supplemental body 75 of the valve device is provided with a downwardly directed cylindrical member 96 which passes into an aperture 97 in the cover plate 12 to aid in holding the valve device 73 against rotation. The cylindrical member 96 is recessed as shown at 98 to receive a spiral spring 99, which operates in connection with the end portion 92 of the lever 90 to normally hold the same in a raised position and to normally hold the plunger 93 or the head 95 thereof, in engagement with the cam device 72. The supplemental body 75 of the valve device is provided with a comparatively large opening 100 closed by a plug 101, the opening 100 permitting of the insertion of the lever 90 and spring 99 in the valve device 73.

The outer face of the flange 70 of the hand-piece 68 is provided with an outwardly directed arc-shaped flange 102, which encircles the end of the arm 66 of the bracket 63, as clearly shown in Figs. 2 and 5 and secured to the flange 102 is a block 103, which operates in connection with a plunger 104 mounted in a keeper 105 secured to the arm 66 of the bracket 63, said plunger being normally held in a raised position by a spring 106 mounted in the keeper 105. The spring actuated plunger 104 serves to normally hold the hand-piece 68, or the cam device 72 carried thereby in its inoperative position, whereby the rotation of said hand-piece on the tube 65 will depress the plunger 104 the cam device 72 will depress the plunger 93 to operate the lever 90 and raise the valve 86 to permit the passage of water from the tube 65 through the valve device 73 into the tube 59 and thus into the chamber 22 of the generator 21. As will be apparent upon releasing the hand-piece 68 the spring actuated plunger 104 will return the same to its normal position, and the spring 99 will raise the plunger 93, while the spring 88 will depress the valve 86 thus shutting off the supply of water to the tube 59.

The operation and use of our improved steamer, cleaner and presser will be readily understood from the foregoing description when taken in connection with the accompanying drawing and the following statement. In using the device as a presser only, it will not be necessary to connect a flexible water supply pipe to the tube 65 of the free and projecting end thereof, and the device is heated by opening the valve 52 to permit the passage of gas into the burner 35, or the separate burner tubes 45, 46 and 47 thereof, and this burner will operate to readily heat the bottom and supplemental bottom of the casing 10 and the device may be used in the manner of an ordinary sadiron.

When it is desired to use the device as a steamer, cleaner and presser, a suitable flexible water supply pipe is first connected with the tube 65 and both of the burners 34 and 35 are put in operation by opening the valves 43 and 52 and suitably operating the air regulators 44 and 54, after the burners have been in operation for a short time the device may be used for the purposes set out and, in the operation of grasping the handle member 64, or the hand-piece 68 thereof, the operator turns said hand-piece to depress the plunger 93 through the cam device 72 to open the valve 86, as hereinbefore described, thus permitting of the passage of water into the pipe 59 and into the chamber 22 of the generator 21. In this last operation the water is directed upwardly over the baffle plates 27 and then downwardly around the pipes 26 into the bottom portion of the generator, and when the generator is heated to a predetermined degree by the burner 34 the steam generated in the chamber 22 passes through the apertures 28 in the pipes 26 downwardly through said pipes into the grooves 17 and 18, which form ports or passages in the bottom of the casing 10 and thus out through the apertures 19 in the bottom 16 of said casing and onto the fabric or garment which is to be steamed, cleaned and pressed.

It will be apparent from the foregoing that our improved device may be used for two or more purposes, and by reason of the construction of the device, the operation and use thereof is very simple and convenient as well as automatic. The degree of heat of the burners 34 and 35 may be regulated through the valves 43 and 52, as will be apparent, and the amount of water supplied to the generator 21 may also be regulated by the extent of the rotary movement of the hand-piece 68, or the cam 72 thereof, this movement being controlled by an adjustable screw 107 on the block 103 which operates in connection with one side face of the arm 66 of the bracket 63, as clearly shown in Fig. 2. One end 108 of the flange 102 operates in connection with the other side face of the arm 66 to limit the movement of the hand-piece 68 in one direction.

The side walls of the casing 10 are also preferably provided with a plurality of apertures 109 which in connection with the open end 110 of said casing permits of the circulation of air through the casing 10 and out through the apertures 31 and 32 thus supplying the combustion chamber 30 with the required amount of air for the proper burning of the burner device 33, and while we have shown certain details of construction for carrying our invention into effect and a specific form of valve device 73 we are not limited to these details, and various changes in and modifications of the details of construction herein shown and described may be made, within the scope of the appended claims without departing from the spirit of our invention or sacrificing its advantages.

Having fully described our invention, what we claim as new and desire to secure by Letters Patent, is:—

1. In a device of the class described, a suitable casing, a hollow U-shaped steam generator in and independent of said casing, means for supplying water to the generator, the bottom of the casing being provided with a plurality of discharge apertures, means connected with said generator and the bottom of the casing for placing said discharge apertures in communication with said generator whereby the steam in said generator may be discharged through the bottom face of said casing, and burner devices mounted within the casing and said generator for independently heating the bottom of said casing and said generator.

2. In a device of the class described, a suitable casing, the bottom of which is provided with a plurality of transversely and longitudinally arranged passages in communication, the bottom of the casing being provided with apertures in communication with said chambers which open outwardly through the bottom face of said casing, a U-shaped steam generator mounted within the casing, means at the opposite sides of said generator placing the same in communication with the chambers in the bottom of the casing, said means extending upwardly into the top portion of said steam generator whereby the steam in said generator may be passed through said means into the chambers in the bottom of the casing and out through the apertures communicating with said chambers.

3. In a device of the class described, a suitable casing, a U-shaped steam generator mounted therein, a water supply pipe passed into and longitudinally through the top central portion of the generator through which water is supplied to said generator, the bottom of the casing being provided with a steam chamber and with apertures which communicate with said chamber and open outwardly through the bottom face of said casing, and steam tubes mounted in the opposite sides of the steam generator and extending upwardly to the top portion thereof and downwardly and placed in communication with the steam chamber in the bottom of said casing, the upper ends of said tubes being perforated whereby the steam in said generator may pass into said tubes and downwardly into the steam chamber of said casing and out through the apertures in the bottom thereof.

4. In a device of the class described, a suitable casing, a handle member for said casing, a steam generator in said casing, means for supplying water to the generator, a valve device for controlling said water supplying means, a cam rotatably mounted on the handle member for operating said valve device, the bottom of the casing being provided with a plurality of discharge apertures, means connected with said generator and the bottom of the casing for placing said discharge apertures in communication with said generator whereby the steam in said generator may be discharged through the bottom face of said casing, and burner devices mounted within the casing and said generator for independently heating the bottom of said casing and said generator.

In testimony that we claim the foregoing as our invention we have signed our names in presence of the subscribing witnesses this 8th day of December 1919.

GEORGE FRANKS.
OSCAR SPROESSIG.

Witnesses:
C. E. MULREANY,
H. E. THOMPSON.